United States Patent Office 3,495,854
Patented Feb. 17, 1970

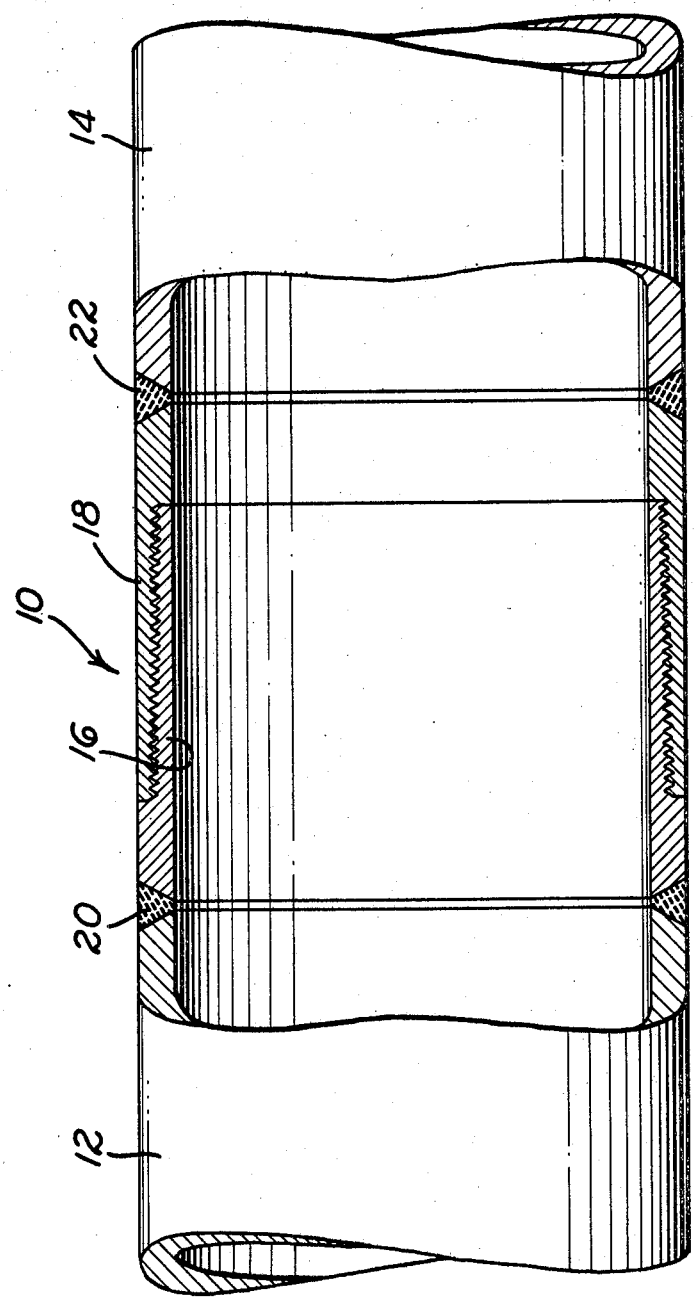

3,495,854
HIGH STRENGTH FLUSH JOINT FOR OIL WELL CASING, OR THE LIKE
Donald W. Fether, Saticoy, Calif.
(620 Tam O'Shanter W., Las Vegas, Nev. 89109)
Filed Nov. 1, 1968, Ser. No. 772,541
Int. Cl. F16l 13/02, 47/02, 15/00
U.S. Cl. 285—173       1 Claim

ABSTRACT OF THE DISCLOSURE

A flush joint for oil well casing having a strength at least approximately equal to that of the casing sections connected by the joint. High-strength pin and box members are welded to the respective tubing ends by high-strength submerged arc welds, the over-all inside and outside diameters of the pin and box members, the welds and the tubings all being substantially equal to render the joint flush internally and externally. The pin and box members have a tensile yield strength at least about twice that of the casing sections, and the welds have a tensile yield strength at least about that of the tubings.

BACKGROUND OF INVENTION

Oil well casings with flush joints have been used for many, many years in special situations. For example, it is advisable to use flush joint casing in a hole with sloughing or caving formations for maximum assurance that the casing will be run in to the desired depth.

Another reason for using flush joint casing is to permit running in the largest size casing possible. Ordinarily, a hole will accept flush joint casing one size larger than collared casing. This reduces drilling costs for a new hole, and increases capacity is an existing hole. Still another situation in which flush joint casing is advantageous is in the completion of a well under pressure since such casing can be run through packers without damage thereto. Various other uses for flush joint casing exist.

For all the years that flush joint casing has been known and used, it has suffered the serious disadvantage of low strength. At best, prior flush joints have achieved a strength about 55% of the casing or tubing strength. With smaller diameters and/or wall thicknesses, the "joint efficiency" may drop to around 35%, i.e., the strength of the joint may be only about 35% that of the casing or tubing. These low joint efficiencies have severely restricted the use of flush joint casing or tubing in the past, despite the fact that there has been a need for a high-strength flush joint casing for perhaps over half a century.

SUMMARY AND OBJECTS OF INVENTION

In the light of the foregoing background, the primary object of the invention is to provide a flush casing or tubing joint having a strength much higher than heretofore achieved.

More particularly, the primary object of the invention is to provide a flush joint which attains a strength at least about equal to that of the casing sections or tubings interconnected by the joint.

Still more specifically, an important object of the invention is to provide a flush joint which achieves the desired high strength by utilizing pin and box members having a strength sufficiently higher than that of the casing sections or tubings to offset the thickness reductions required in the mating portions of the pin and box members.

Another object is to utilize pin and box members having a tensile yield strength at least about twice that of the tubings interconnected by the joint, so as to offset the approximately 50% reductions in thickness in the mating portions of the pin and box members.

Still another object of the invention is to interconnect the tubings and the pin and box members by welds having a tensile strength at least about that of the tubings. This is readily achievable with conventional oilfield casings or tubings by using submerged arc welds, which is another object of the invention.

In summary, the present invention provides a high-strength flush joint for interconnecting adjacent ends of two tubings in end-to-end relation, which comprises: complementary pin and box members and welds respectively connecting them to the tubing ends; the tubings, the pin and box members and the welds all having substantially the same over-all inside and outside diameters to render the joint internally and externally flush; the pin and box members having a tensile yield strength at least about twice that of the tubings; and the welds being submerged arc welds having a tensile strength at least about that of the tubings.

With the foregoing construction, the overall tensile strength of the flush joint of the invention is at least as high as that of the casing sections or tubings, which is an important feature of the invention.

The foregoing objects, advantages, features and results of the present invention, together with various other objects, advantages, features and results thereof which will be evident to those skilled in this art in the light of the present disclosure, may be achieved with the exemplary embodiment of the invention illustrated in the accompanying drawing and described in detail hereinafter.

DESCRIPTION OF DRAWING

The single figure of the drawing is a longitudinal sectional view of a high-strength flush casing or tubing joint which embodies the invention.

DETAILED DESCRIPTION OF EXEMPLARY EMBODIMENT OF INVENTION

Referring to the drawing, the high-strength flush joint of the invention is designated generally by the numeral 10 and is shown as interconnecting casing sections or tubings 12 and 14 in end-to-end relation. It will be noted that all portions of the joint 10 are internally and externally flush with the tubings 12 and 14.

More particularly, the flush joint 10 includes complementary pin and box members 16 and 18 and welds 20 and 22 respectively connecting these members to the adjacent ends of the tubings 12 and 14.

In the particular construction illustrated, the reduced-thickness mating portions of the pin and box members are shown as threadedly interconnected with simple V threads. However, the pin 16 and the box 18 may be interconnected in other ways. For example, they may be provided with threads, not shown, of the square type to eliminate the expanding stresses in the box 18 and the collapsing stresses in the pin 16 encountered with simple V threads.

As previously pointed out, the joint 10 is flush with the tubings 12 and 14 both internally and externally, this being achieved by providing the tubings, the pin and box members 16 and 18, and the welds 20 and 22 with substantially the same over-all inside and outside diameters. If the welds 20 and 22 contain any excess metal upon completion thereof, such excess may be ground off, or otherwise removed.

As is typical of pin and box connections, the mating portions of the pin and box members 16 and 18 have thicknesses averaging approximately one-half the over-all wall thicknesses of these members. To offset these thickness reductions, and to provide the mating portions of the pin and box members 16 and 18 with strengths about equal to the strength of the tubings 12 and 14, the pin and box members are made of a material having a strength at least about double the strength of the material of the tubings.

Similarly, the material of the welds 20 and 22 is so selected as to provide it with a strength at least about equal to the strength of the material of the tubings 12 and 14.

With the foregoing strength relationships, the mating portions of the pin and box members 16 and 18, the welds 20 and 22, and the tubings 12 and 14 are all about equal in strength. Thus, the invention readily achieves a strength for the joint 10 at least equal to the strength of the tubings 12 and 14, which is the essential feature of the invention.

Considering some specific examples embodying the present invention, the tubings 12 and 14 may be J-55 or N-80 oilfield casing respectively having tensile yield strengths of 55,000 and 80,000 p.s.i.

If N-80 casing is used, the pin and box members 16 and 18 may be made of 4140, or similar, steel, heat treated to a tensile yield strength of 160,000 p.s.i. Such a material is capable of providing the mating portions of the pin and box members 16 and 18 with strengths at least about equal to the strength of N-80 casing. It might be pointed out that a material of this nature for the pin and box members 16 and 18 has a Rockwell hardness of about 40 and is thus machinable. The members 16 and 18 may be heat treated after welding, or they may be heat treated first and may then be subjected to reasonably careful temperature control during and after welding. With J-55 casing, a material having a yield strentgh of the order of 110,000 p.s.i. may be used for the members 16 and 18.

The welds 20 and 22 are preferably submerged arc welds utilizing a fusion metal or alloy having a tensile yield strength of about 90,000 p.s.i. Thus, the welds 20 and 22 are at least as strong as the tubings 12 and 14 and the reduced-thickness portions of the pin and box members 16 and 18. Welds 20 and 22 of this strength can be achieved readily utilizing conventional submerged arc welding techniques.

As will be apparent from the foregoing examples, the net result is to provide the flush joint 10 with strengths throughout which are nowhere less than the strength of the tubings 12 and 14. In other words, the invention provides a joint efficiency of at least about 100%, which is the essential feature.

Although an exemplary embodiment of the invention has been disclosed herein for purposes of illustration, it will be understood that various changes, modifications and substitutions may be incorporated in such embodiment without departing from the spirit of the invention.

I claim as my invention:

1. A high-strength flush joint interconnecting adjacent ends of two tubings in end-to-end relation, comprising:
    (a) complementary pin and box members and welds respectively connecting them to said tubing ends;
    (b) said tubings, said pin and box members and said welds all having substantially the same over-all inside and outside diameters;
    (c) said pin and box members having threadedly engaged portions of thicknesses averaging substantially one-half the over-all wall thicknesses of these members; and
    (d) the strengths of said welds and said threadedly engaged portions of said pin and box members being at least substantially equal to that of said tubings so that the over-all strength of the joint is at least substantially equal to that of said tubings.

References Cited

UNITED STATES PATENTS

| | | | |
|---|---|---|---|
| 1,320,503 | 11/1919 | Smith | 285—333 X |
| 1,849,075 | 3/1932 | Dardelet | 287—125 |
| 2,088,763 | 8/1937 | Sample | 285—173 |
| 2,555,256 | 5/1951 | Tyson | 285—422 X |
| 2,737,710 | 3/1956 | Noble et al. | 29—483 X |
| 2,763,923 | 9/1956 | Webb | 285—286 X |
| 3,080,179 | 3/1963 | Huntsinger | 285—422 X |

FOREIGN PATENTS 892,856    1/1944    France.

DAVID J. WILLIAMOWSKY, Primary Examiner

DAVE W. AROLA, Assistant Examiner

U.S. Cl. X.R.

285—286, 390